US012807304B2

(12) United States Patent
Hancock

(10) Patent No.: US 12,807,304 B2
(45) Date of Patent: Nov. 24, 2026

(54) AIRCRAFT LANDING GEAR ASSEMBLY

(71) Applicant: Airbus Operations Limited, Filton (GB)

(72) Inventor: Nicholas Hancock, Filton (GB)

(73) Assignee: Airbus Operations Limited, Filton Bristol (GB)

(*) Notice: Subject to any disclaimer, the term of this patent is extended or adjusted under 35 U.S.C. 154(b) by 0 days.

(21) Appl. No.: 19/306,194

(22) Filed: Aug. 21, 2025

(65) Prior Publication Data

US 2026/0077857 A1 Mar. 19, 2026

(30) Foreign Application Priority Data

Sep. 19, 2024 (GB) ..................................... 2413804

(51) Int. Cl.
*B64C 25/14* (2006.01)
*B64C 25/04* (2006.01)

(52) U.S. Cl.
CPC .............. *B64C 25/14* (2013.01); *B64C 25/04* (2013.01)

(58) Field of Classification Search
CPC ... B64C 25/14; B64C 25/04; B64C 2025/125; B64C 25/10; B64C 25/62; B64C 25/30; B64C 25/34; B64C 25/08; B64C 25/36; B64C 25/58
See application file for complete search history.

(56) References Cited

U.S. PATENT DOCUMENTS 2,348,493 A * 5/1944 Macdonald ............. B64C 25/50 244/109
2,668,030 A * 2/1954 Smith ..................... B64C 25/26 74/529

(Continued)

FOREIGN PATENT DOCUMENTS

| | | | |
|---|---|---|---|
| CN | 118597409 | A | 9/2024 |
| KR | 1020110067289 | A | 6/2011 |
| KR | 101229602 | B1 | 2/2013 |

OTHER PUBLICATIONS

United Kingdom Search and Examination Report for corresponding United Kingdom Patent Application No. 2413804.2 dated Jan. 27, 2025.

(Continued)

*Primary Examiner* — Medhat Badawi
(74) *Attorney, Agent, or Firm* — Greer, Burns & Crain, Ltd.

(57) ABSTRACT

A landing gear assembly for an aircraft having a main body on which one or more wheels of the aircraft are mounted, the main body aftwardly pivotable, about a pintle line, into a landing gear bay of the aircraft; and a bracing structure coupled to the main body, the bracing structure movable between an extended configuration to support the main body in a deployed configuration, and into a folded configuration in which the main body is held in a retracted configuration. The bracing structure includes at least a first component of preferential weakness configured to fail when subjected to a critical load when the main body is in the deployed configuration, to thereby decouple the main body from at least part of the bracing structure and enable the main body to pivot aftwards, into the landing gear bay. Also an aircraft having such a landing gear assembly.

19 Claims, 6 Drawing Sheets

(56) References Cited

U.S. PATENT DOCUMENTS

| | | | | |
|---|---|---|---|---|
| 2,732,152 | A * | 1/1956 | Neilson et al. | B64C 25/60 244/104 FP |
| 2,792,998 | A * | 5/1957 | Dowty | B64C 25/44 188/18 R |
| 3,556,440 | A * | 1/1971 | Lallemant | B64C 25/58 244/50 |
| 3,596,740 | A * | 8/1971 | Nau | B64C 25/20 188/134 |
| 4,087,062 | A * | 5/1978 | Masclet | B64C 25/00 244/102 R |
| 4,155,522 | A * | 5/1979 | Sealey | B64C 25/10 244/102 R |
| 4,345,727 | A * | 8/1982 | Brown | B64C 25/12 244/102 R |
| 4,392,623 | A * | 7/1983 | Munsen | B64C 25/10 244/102 R |
| 4,537,374 | A * | 8/1985 | Barnoin | F16F 7/125 188/371 |
| 4,607,180 | A * | 8/1986 | Stoody | F16H 25/2018 310/112 |
| 4,720,063 | A * | 1/1988 | James | B64C 25/14 244/102 R |
| 4,892,270 | A * | 1/1990 | Derrien | B64C 25/34 244/104 R |
| 5,092,539 | A * | 3/1992 | Caero | F16H 25/2204 254/102 |
| 5,110,068 | A * | 5/1992 | Grande | B64C 25/34 244/100 R |
| 5,269,481 | A * | 12/1993 | Derrien | B64C 25/18 244/102 R |
| 5,429,323 | A * | 7/1995 | Derrien | B64C 25/14 244/102 R |
| 6,651,931 | B1 * | 11/2003 | Fox | B64C 25/12 244/104 R |
| 7,066,429 | B2 * | 6/2006 | Mellor | B64C 25/10 244/102 R |
| 7,575,193 | B2 * | 8/2009 | Payen | B64C 25/14 244/102 R |
| 8,376,272 | B2 * | 2/2013 | Bennett | B64C 25/60 244/102 SL |
| 8,499,653 | B1 * | 8/2013 | Sheahan, Jr. | F16H 25/20 74/424.78 |
| 8,602,352 | B2 * | 12/2013 | Keller | B64C 25/26 244/102 R |
| 8,939,400 | B2 * | 1/2015 | Mellor | B64C 25/62 244/102 R |
| 9,321,524 | B2 * | 4/2016 | Holloway | B64C 25/14 |
| 10,364,022 | B2 * | 7/2019 | Bond | B64C 25/30 |
| 11,167,840 | B2 * | 11/2021 | Block | B64C 3/187 |
| 11,377,205 | B2 * | 7/2022 | Woolcock | B64C 25/04 |
| 11,584,515 | B2 * | 2/2023 | Martin | B64C 25/14 |
| 11,753,150 | B2 * | 9/2023 | Park | B64U 50/14 244/17.11 |
| 11,794,882 | B1 * | 10/2023 | Rayner | B64C 25/52 |
| 11,912,400 | B2 * | 2/2024 | Wilson | B64C 25/26 |
| 12,006,989 | B1 * | 6/2024 | Kosel | B64C 29/0025 |
| 12,097,950 | B2 * | 9/2024 | Venn | B64C 25/26 |
| 12,280,866 | B2 * | 4/2025 | Hill | B64C 25/26 |
| 12,397,905 | B1 * | 8/2025 | Lyver | B64C 25/16 |
| 12,454,348 | B2 * | 10/2025 | Hancock | B64C 25/34 |
| 12,466,549 | B2 * | 11/2025 | Bishop | B64C 25/12 |
| 12,473,082 | B2 * | 11/2025 | Bresciani | B64C 25/58 |

| | | | | |
|---|---|---|---|---|
| 2004/0103742 | A1 * | 6/2004 | Tesar | H02K 16/00 310/83 |
| 2005/0011991 | A1 * | 1/2005 | Ducos | B64C 25/58 244/102 R |
| 2005/0269887 | A1 * | 12/2005 | Blanding | F16H 25/2015 310/112 |
| 2009/0057484 | A1 * | 3/2009 | White | B64C 25/12 244/102 A |
| 2009/0108129 | A1 * | 4/2009 | Flatt | F16H 25/2021 73/865.9 |
| 2009/0108131 | A1 * | 4/2009 | Lavigne | B64C 25/12 244/102 R |
| 2009/0250552 | A1 * | 10/2009 | Kearns | B64C 25/26 244/102 A |
| 2009/0289145 | A1 * | 11/2009 | Behar | B64C 13/341 310/78 |
| 2009/0314884 | A1 * | 12/2009 | Elliott | F16H 35/10 244/102 R |
| 2009/0321560 | A1 * | 12/2009 | Luce | B64C 25/14 244/102 R |
| 2010/0012779 | A1 * | 1/2010 | Collins | B64C 25/30 244/102 R |
| 2010/0116930 | A1 * | 5/2010 | Griffin | B64C 25/34 244/102 A |
| 2010/0282901 | A1 * | 11/2010 | Mason | B64C 25/18 244/102 R |
| 2011/0147518 | A1 * | 6/2011 | Nannoni | B64C 25/14 244/102 A |
| 2011/0163202 | A1 * | 7/2011 | Martinez | B64C 25/26 244/102 SL |
| 2011/0180662 | A1 * | 7/2011 | Nardone | B64C 25/14 244/102 R |
| 2011/0198441 | A1 * | 8/2011 | Dubuisson | B64C 25/14 244/102 SS |
| 2013/0105624 | A1 * | 5/2013 | Dubois | B64C 25/28 244/102 R |
| 2013/0119197 | A1 * | 5/2013 | Ducos | B64C 25/26 244/102 R |
| 2014/0151499 | A1 * | 6/2014 | Mellor | B64C 25/04 244/100 R |
| 2016/0016656 | A1 * | 1/2016 | Thompson | B64D 1/06 49/400 |
| 2019/0002089 | A1 * | 1/2019 | Thompson | B64C 25/10 |
| 2019/0135416 | A1 * | 5/2019 | Woolcock | B64C 25/04 |
| 2020/0324882 | A1 * | 10/2020 | Cazin | B64C 3/185 |
| 2020/0339250 | A1 * | 10/2020 | Baird | B64C 25/10 |
| 2021/0394890 | A1 * | 12/2021 | Cottet | B64C 25/12 |
| 2023/0211874 | A1 * | 7/2023 | Fernandes | B64C 25/14 244/102 R |
| 2023/0373614 | A1 * | 11/2023 | Bishop | B64C 25/14 |
| 2023/0373615 | A1 * | 11/2023 | Bishop | B64C 25/12 |
| 2023/0373650 | A1 * | 11/2023 | Trevisan | B64C 25/34 |
| 2024/0294250 | A1 * | 9/2024 | Nguyen | B64C 25/20 |
| 2024/0300639 | A1 * | 9/2024 | Bresciani | B64C 25/60 |
| 2025/0002140 | A1 * | 1/2025 | Nguyen | B64C 25/02 |
| 2025/0002142 | A1 * | 1/2025 | Isaac | B64C 25/34 |
| 2025/0145280 | A1 * | 5/2025 | Doux | B64C 25/001 |
| 2025/0178719 | A1 * | 6/2025 | Hancock | B64C 25/34 |
| 2026/0042548 | A1 * | 2/2026 | Cretnik | B64C 25/32 |
| 2026/0077857 | A1 * | 3/2026 | Hancock | B64C 25/14 |

OTHER PUBLICATIONS

European Search Report for corresponding European Patent Application No. 25198118.9 dated Oct. 23, 2025.

* cited by examiner

AIRCRAFT LANDING GEAR ASSEMBLY

CROSS-REFERENCES TO RELATED APPLICATIONS

This application claims the benefit of United Kingdom Patent Application Number 2413804.2 filed on Sep. 19, 2024, the entire disclosure of which is incorporated herein by way of reference.

FIELD OF THE INVENTION

This invention relates to a landing gear assembly for an aircraft. The invention is particularly suitable, but by no means limited, for use with a blended wing body (BWB) aircraft.

BACKGROUND TO THE INVENTION

The landing gear of a commercial passenger aircraft typically includes a main landing gear assembly beneath each wing of the aircraft, and/or beneath the fuselage of the aircraft. The landing gear also typically includes a smaller landing gear assembly, beneath or near to the aircraft's nose (also known as the "nose gear"). Usually, each landing gear assembly is retractable into a respective landing gear bay (or simply "gear bay") within the wings or fuselage of the aircraft during flight, in order to reduce drag, and is extendable from the gear bay, into a deployed configuration, for taxiing, take-off and landing operations, or for when the aircraft is parked.

Blended wing body (BWB) aircraft have wing and body structures that are smoothly blended together, thereby reducing drag compared to aircraft having a conventional wing-body junction. The body of a BWB may also be shaped to provide lift (as well as providing space for passengers and/or cargo), thereby enabling the size and drag of the wings to be reduced.

In certain passenger aircraft, the main landing gear assemblies and/or the nose gear may be configured to retract aftwards into a respective gear bay. Particularly (but not exclusively) in the case of main landing gear assemblies, the respective gear bays may be close to a passenger area of the aircraft. This may particularly be the case with a BWB aircraft, in which the gear bay for each main landing gear may be directly behind a passenger area, or alongside a passenger area.

In the event of an extraordinarily hard landing or crash landing that would cause a landing gear assembly to fail, it is important that the landing gear assembly should fail safely. In particular, in the case of an aftwardly-retractable landing gear assembly (either a main landing gear assembly or a nose gear) there is a desire that, in the event of failure, the landing gear assembly should remain attached to the aircraft and collapse in a controlled manner away from the passenger areas of the aircraft. Although such an objective is applicable to all types of passenger aircraft, this is particularly relevant in the case of a BWB aircraft in which the gear bays may be behind the passenger areas, and for which the risk of a landing gear assembly penetrating the nearby passenger area would consequently be greater in a failure scenario.

SUMMARY OF THE INVENTION

Aspects and embodiments of the present invention are described in the various embodiments herein.

According to a first aspect of the present invention there is provided a landing gear assembly for an aircraft, the landing gear assembly comprising: a main body on which one or more wheels of the aircraft are mounted, the main body being aftwardly pivotable about a pintle line into a landing gear bay of the aircraft; and a bracing structure coupled to the main body, the bracing structure being configurable into an extended configuration to support the main body in a deployed configuration, and into a retracted or folded configuration in which the main body is held in a retracted configuration; wherein the bracing structure includes at least a first component of preferential weakness configured to fail when subjected to a critical load when the main body is in the deployed configuration, to thereby decouple the main body from at least part of the bracing structure and enable the main body to pivot aftwards, into the landing gear bay.

Consequently, in the event of an extraordinarily hard landing or crash landing that causes failure of the landing gear assembly, the main body is able to collapse in a controlled manner aftwards, into the landing gear bay and away from the passenger areas of the aircraft, without being constrained by the bracing structure.

The aircraft may be a commercial passenger aircraft, for example an aircraft capable of transporting more than 50, for example more than 100 passengers. For the purposes of this application the term "commercial passenger aircraft" is also taken to include aircraft of the same type configured for cargo transport.

Preferably the first component of preferential weakness is a first fuse pin (which may alternatively be termed a "fusible pin") configured to shear when subjected to a critical load, the first fuse pin being incorporated in a first joint of the bracing structure.

Preferably the bracing structure comprises a first bracing member that is pivotally coupled to the main body, and a second bracing member that is pivotally coupled to the first bracing member about the first joint.

Preferably the bracing structure further comprises a third bracing member that is pivotally coupled to the first bracing member about a second joint, to one side of the first joint, and wherein the second joint incorporates a second fuse pin.

The first bracing member may be substantially in the shape of an inverted "A", or substantially in the shape of a "V" or "Y", wherein the first bracing member is pivotally coupled to the main body at an apex of the first bracing member, and wherein the second and third bracing members are pivotally coupled to the opposite end of the first bracing member from the main body.

The second and third bracing members may be substantially longitudinally aligned with sides of the first bracing member when the bracing structure is in the extended configuration. The second and third bracing members may be folded relative to the first bracing member when the bracing structure is in the retracted configuration.

Preferably the second and third bracing members are pivotally coupled to either side of the first bracing member and arranged such that, upon shearing of the first and second fuse pins, the main body is able to pivot aftwards (with the first bracing member attached) and to pass between the second and third bracing members, into the landing gear bay.

Preferably the first joint comprises: a first end part of the first bracing member; a first end part of the second bracing member; and the first fuse pin; wherein the first fuse pin passes through an aperture in the first end part of the first bracing member and through an aperture in the first end part of the second bracing member and pivotally couples the first end part of the first bracing member alongside the first end part of the second bracing member.

Similarly, the second joint preferably comprises: a second end part of the first bracing member; a first end part of the third bracing member; and the second fuse pin; wherein the second fuse pin passes through an aperture in the second end part of the first bracing member and through an aperture in the first end part of the third bracing member and pivotally couples the second end part of the first bracing member alongside the first end part of the third bracing member.

Preferably the first fuse pin incorporates a region of preferential weakness aligned between the first end part of the first bracing member and the first end part of the second bracing member, and the second fuse pin incorporates a region of preferential weakness aligned between the second end part of the first bracing member and the first end part of the third bracing member.

Optionally, in each of the first and second fuse pins, the region of preferential weakness may be offset towards the first bracing member.

Preferably the main body comprises: first and second pivot points (e.g. gudgeons) defining a pivot axis or pintle line about which the main body is aftwardly pivotable; and a third pivot point to which the bracing structure is coupled, the third pivot point being beneath the first and second pivot points.

The main body may further comprise a shock absorber beneath the third pivot point.

The landing gear assembly may be a main landing gear assembly. Alternatively, it may be a nose gear, for example.

According to a second aspect of the invention there is provided an aircraft comprising: the landing gear assembly according to the first aspect; and a landing gear bay; wherein the main body of the landing gear assembly is aftwardly pivotable into the landing gear bay, such that the main body can enter the landing gear bay in the event of said component(s) of preferential weakness (e.g. fuse pins) failing when the main body is in the deployed configuration.

The aircraft may be a blended wing body (BWB) aircraft. Alternatively, however, it may be another type of aircraft. The landing gear bay may be behind a passenger area of the aircraft.

BRIEF DESCRIPTION OF THE DRAWINGS

Embodiments of the invention will now be described, by way of example only, and with reference to the drawings in which.

In the figures, like elements are indicated by like reference numerals throughout.

DETAILED DESCRIPTION OF THE PREFERRED EMBODIMENTS

The present embodiments represent the best ways known to the Applicant of putting the invention into practice. However, they are not the only ways in which this can be achieved.

Figure 1:
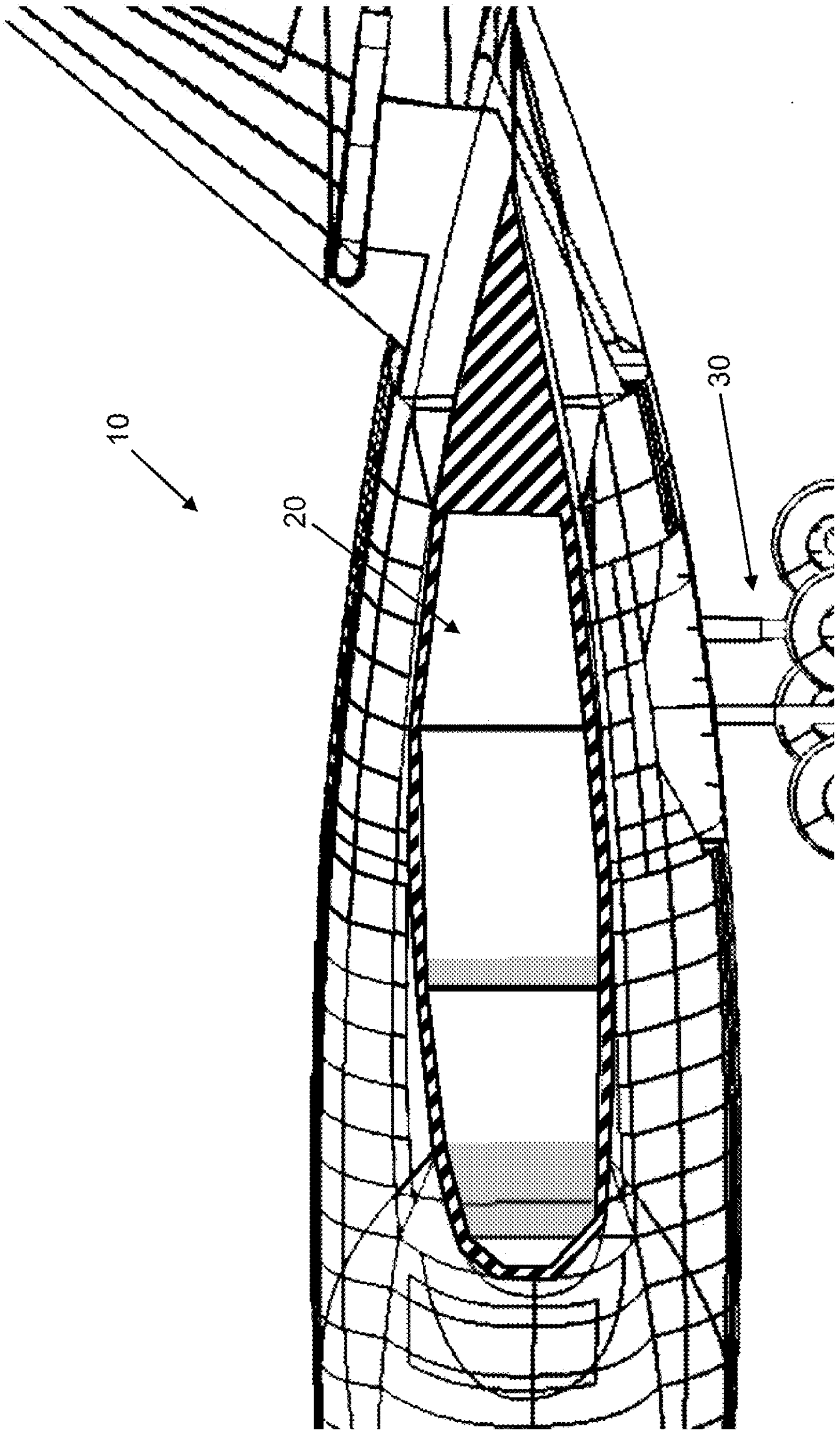
FIG. 1 is a schematic side view of a BWB aircraft.

FIG. 1 shows an example of a blended wing body (BWB) aircraft 10, facing towards the left of the figure. However, it should be noted that the teachings of the present disclosure are not limited to BWB aircraft, and those skilled in the art will appreciate that they may alternatively be applied to other aircraft types.

The illustrated BWB aircraft 10 comprises a blended wing/body structure 20 and a landing gear assembly 30 extending beneath the wing/body structure 20. The blended wing/body structure 20 acts as both a wing structure, to provide lift, and a body structure in which passengers (or cargo) can be carried. In the illustrated example the landing gear assembly 30 is a main landing gear assembly, although the teachings of the present disclosure are not limited to main landing gear assemblies, and may alternatively be applied to nose gear assemblies, for example.

Figure 2B:
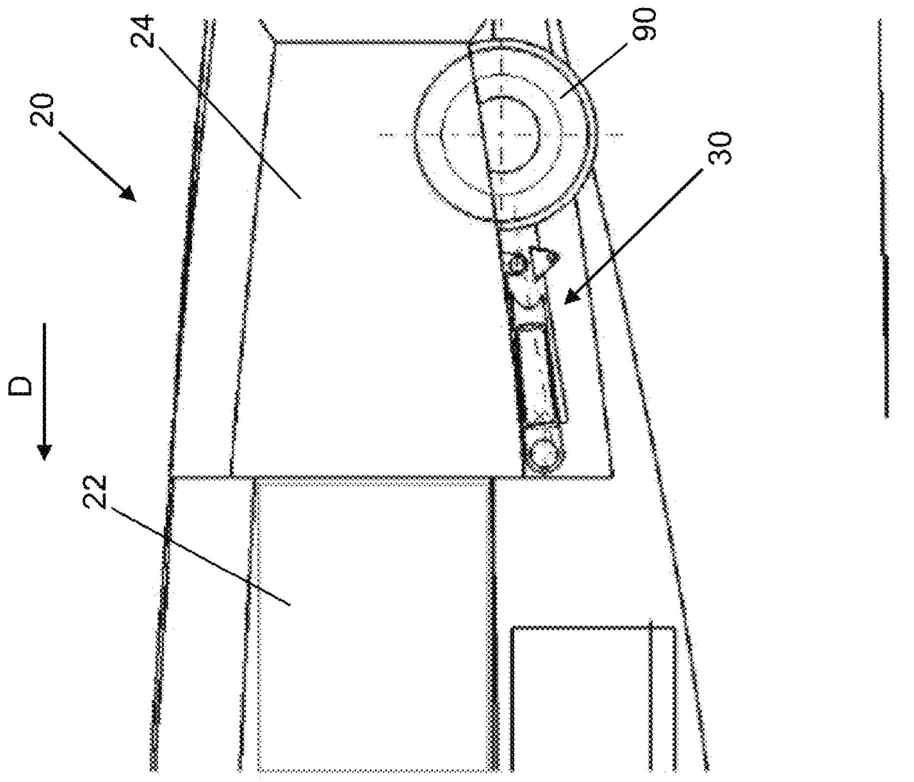
FIG. 2*b* is a cross-sectional schematic side view of the BWB aircraft of FIG. 2*a* with the aftwardly pivotable landing gear assembly in a retracted configuration.
Figure 2A:
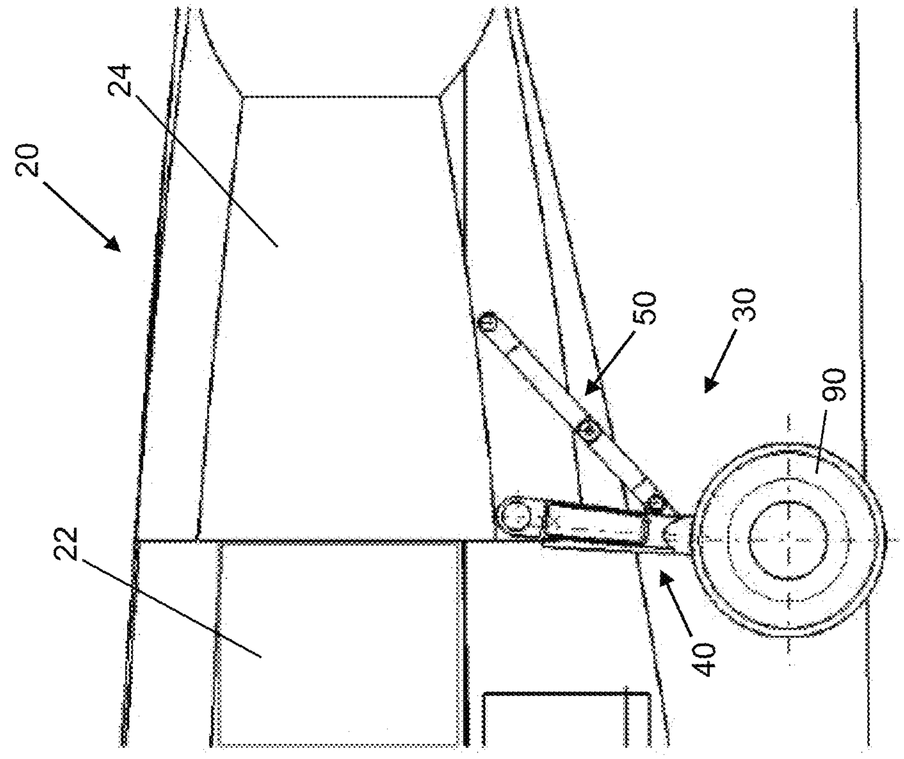
FIG. 2*a* is a cross-sectional schematic side view of a BWB aircraft having a landing gear bay immediately behind a passenger area, and showing an aftwardly pivotable landing gear assembly in a deployed configuration.

FIGS. 2*a* and 2*b* are a cross-sectional schematic side view of the blended wing/body structure 20 of a BWB aircraft 10, in the region of a main landing gear assembly 30. Again, the aircraft 10 is facing towards the left of the figure. The blended wing/body structure 20 includes a landing gear bay 24 behind a passenger area 22.

Mounted beneath the landing gear bay 24 is an aftwardly-retractable landing gear assembly 30 (i.e. retractable towards the right of the figure). The landing gear assembly 30 comprises a main body 40 on which one or more wheels 90 of the aircraft 10 are mounted, and a bracing structure 50 coupled to the main body 40. In FIG. 2*a* the bracing structure 50 has been brought (by the operation of actuators) into an extended configuration, to support the main body 40 in a deployed configuration (as when the aircraft is performing taxiing, take-off and landing operations, or is parked). On the other hand, in FIG. 2*b* the bracing structure 50 has been brought (by the operation of actuators) into a retracted (folded) configuration, in which the main body 40 is held in a retracted configuration within the landing gear bay 24, as in flight (in direction D).

It should be noted that actuator components (such as hydraulic pistons and associated couplings) that move the landing gear assembly 30 between the deployed and retracted configurations have been omitted from the present drawings for the sake of clarity. Those skilled in the art will readily appreciate how such actuator components may be applied to landing gear assemblies, and so this need not be described further herein. Similarly, brake components have also been omitted from the drawings for the sake of clarity, and will not be described further herein.

The main role of the present disclosure is carried out when the main body 40 is in its deployed configuration, as in FIG. 2*a*, and allows the landing gear assembly 30 to fail safely in the event of an extraordinarily hard landing or crash landing. In particular, in the event of such a landing, the present disclosure enables the main body 40 to break free from the constraint otherwise provided by the bracing structure 50 when in its extended configuration, and to collapse in a controlled manner into the landing gear bay 24, without penetrating the nearby passenger area 22 of the aircraft.

Figure 3:
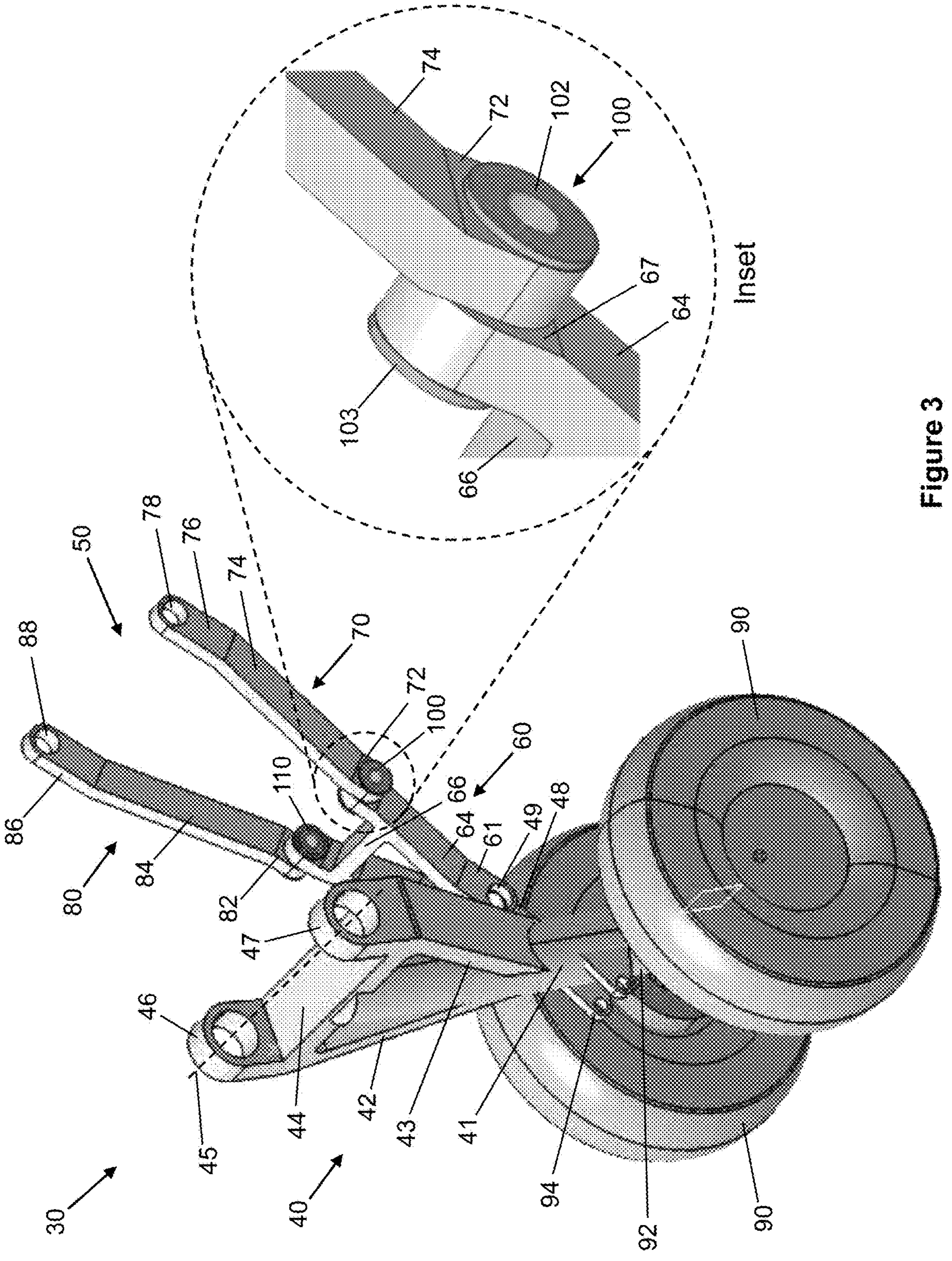
FIG. 3 is a perspective view of an example of a landing gear assembly comprising a main body and a bracing structure, wherein the bracing structure comprises first, second and third bracing members and incorporates a pair of fuse pins configured to shear in the event of an extraordinarily hard landing or crash landing.

Turning now to FIG. 3, this shows in detail an example landing gear assembly 30 in accordance with the present disclosure. The landing gear assembly 30 comprises a main body 40 on which one or more wheels 90 of the aircraft are mounted, and a bracing structure 50 coupled to the main body 40. These will now be described in detail.

The Main Body 40

In the illustrated example the main body 40 is formed of a central main strut 41 to which a first side brace 42 and a second side brace 43 are attached. A cross-member 44 is provided at the top of the main body 40, to which the main strut 41 and the side braces 42, 43 are attached. A shock absorber 92, on which the wheels 90 are mounted, may extend from the bottom of the main strut 41. Attachment mounts 94 for torque links (not illustrated) may also be provided at or near the bottom of the main strut 41. Also provided on the main strut 41 is a hinge mount 48, by means of which the bracing structure 50 is pivotally coupled to the main body 40.

In other examples the main body may take a different form from that illustrated in FIG. 3.

In the illustrated example two wheels 90 are mounted on the main body 40, although in other examples only one wheel may be provided. Alternatively, more than two wheels may be provided—for example four or six wheels, or more, e.g. on a multiple-axle bogie mounted at the bottom of the main body 40.

The main body 40 is aftwardly pivotable into a landing gear bay 24 of the aircraft. More particularly, the main body 40 is pivotable aftwards about a pintle line or pintle axis 45 defined by first and second gudgeons 46, 47 at the top of the main body 40, on and extending perpendicularly from the cross-member 44, into which gudgeons 46, 47 corresponding pintles (not illustrated) are located. Such pintles are mounted on the wing/body structure 20 of the aircraft, in or near to the landing gear bay 24. The first and second gudgeons 46, 47 are at opposing ends of the cross-member 44, such that the first gudgeon 46 is essentially a continuation of the first side brace 42, and the second gudgeon 47 is essentially a continuation of the second side brace 43. The pintle line 45 is aligned across the body of the aircraft, parallel or substantially (i.e., +/−10%) parallel to the transverse axis (or "pitch axis" or "lateral axis") of the aircraft. Thus, pivoting of the main body 40 about the pintle line 45 causes the main body 40 to retract aftwards, into the landing gear bay 24.

In other words, the main body 40 comprises first and second pivot points (respectively comprising the first and second gudgeons 46, 47) defining the pivot axis or pintle line 45 about which the main body 40 is aftwardly pivotable, and a third pivot point (the hinge mount 48) to which the bracing structure 50 is coupled. The third pivot point (the hinge mount 48) is located beneath the first and second pivot points (the first and second gudgeons 46, 47), i.e. between the first and second pivot points and the wheels 90.

Although, in the illustrated example, each of the first and second pivot points comprises a respective gudgeon 46, 47 on the main body 40, into which gudgeon 46, 47 a corresponding pintle on the wing/body structure 20 of the aircraft is engaged, it will be appreciated that, in alternative examples, each of the first and second pivot points may comprise a pintle on the main body 40, engaged within a corresponding gudgeon on the wing/body structure 20. Indeed, more generally, it should be appreciated that the illustrated pivot points may be configured in alternative ways, for example by interchanging gudgeons with pintles, or by employing alternative pivot means.

The Bracing Structure 50

In the illustrated example the bracing structure 50 comprises a first bracing member 60, a second bracing member 70 and a third bracing member 80.

As outlined above, the bracing structure 50 is configurable (by the operation of actuators) into an extended configuration (as in FIG. 2(*a*)) to support the main body 40 in a deployed configuration, and into a retracted configuration (as in FIG. 2(*b*)) in which the main body 40 is held in a retracted configuration within the landing gear bay 24.

When in the extended configuration, the first bracing member 60 forms a lower part of the bracing structure 50, and the second and third bracing members 70, 80 form upper parts of the bracing structure 50.

The bracing structure 50 includes at least a first component of preferential weakness configured to fail when subjected to a critical load when the main body 40 is in the deployed configuration, to thereby decouple the main body 40 from at least part of the bracing structure 50 and enable the main body 40 to pivot aftwards, in a controlled manner, without being constrained by the bracing structure 50.

The critical load of the or each component of preferential weakness corresponds to the ultimate load for which the respective component is engineered. As those skilled in the art will appreciate, the ultimate load is typically calculated as being the limit load of the component multiplied by a safety factor, which is typically 1.5. The limit load of the component is the highest load that the component is expected to experience at any time during its normal service life. Accordingly, in the present case the ultimate load corresponds to extreme conditions as may be experienced during an extraordinarily hard landing or crash landing, and would be never be expected to be reached during normal operation.

In the illustrated example, first and second components of preferential weakness are employed, these being a first fuse pin 100 and a second fuse pin 110. The first fuse pin 100 is incorporated in a first joint of the bracing structure 50, between the first bracing member 60 and the second bracing member 70. The second fuse pin 110 is incorporated in a second joint of the bracing structure 50, between the first bracing member 60 and the third bracing member 80. Each of the fuse pins 100, 110 is configured to shear when subjected to a critical load.

Referring to FIG. 3 in more detail, the first bracing member 60 is pivotally coupled to the main body 40 about a pivot point 49. The second bracing member 70 is pivotally coupled to the first bracing member 60 about the first joint which incorporates the first fuse pin 100. The third bracing member 80 is pivotally coupled to the first bracing member 60 about the second joint which incorporates the second fuse pin 110. The first and second joints are located between the upper parts (bracing members 70 and 80) and the lower part (bracing member 60) of the bracing structure 50 when in the extended configuration, and may be termed "bracing stay apex joints" or simply "apex joints".

Figure 4:
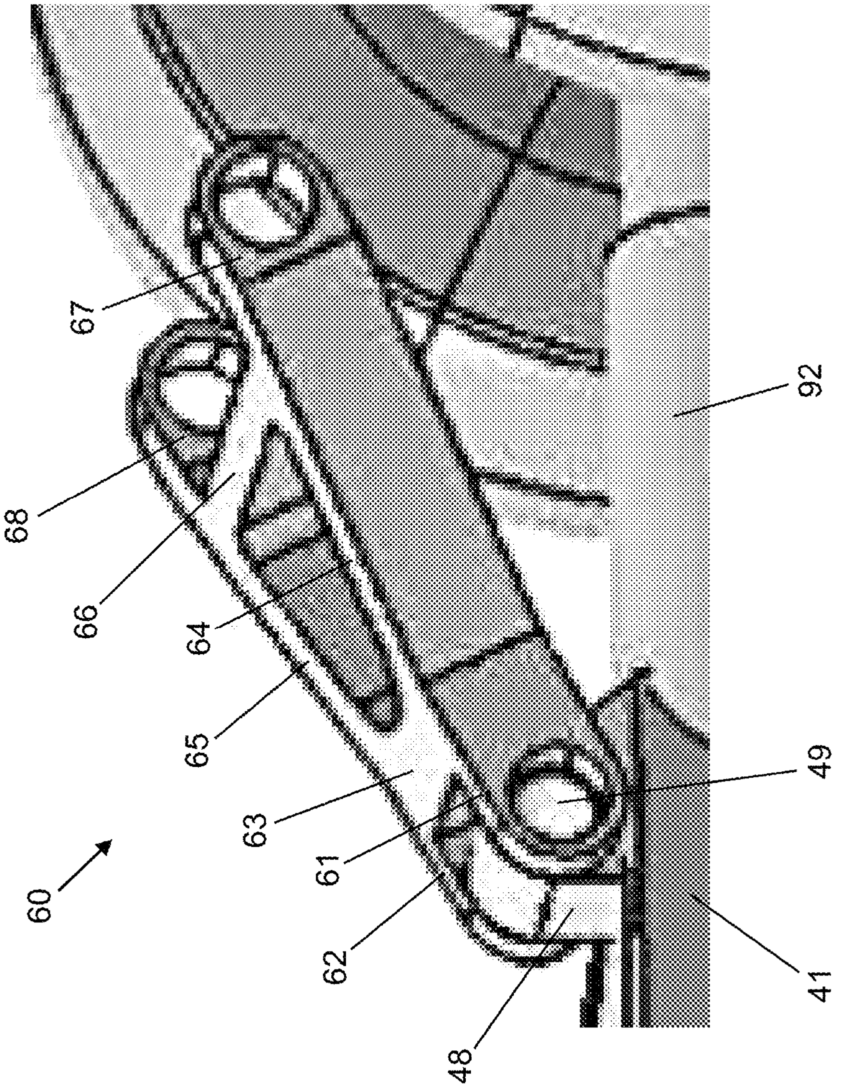
FIG. 4 is an enlarged view of the first bracing member of FIG. 3.

With reference to FIG. 4, in the illustrated example the first bracing member 60 is substantially in the shape of an inverted "A", although it may alternatively have another shape, such as a "V" shape or "Y" shape, for example. By being "substantially in the shape of an inverted "A"" is meant that the first bracing member 60 has first and second side members 64, 65 which taper inwards and join together at an apex region 63, and a cross-member 66 which extends between the side members 64, 65 at the opposite end of the first bracing member 60 from the apex region 63. It will be appreciated that if the cross-member 66 is omitted, the first bracing member 60 may have a "V" shape or "Y" shape instead.

At the apex region 63 the first bracing member 60 further comprises first and second gudgeons 61, 62 into which respective pintles 49 of the hinge mount 48 on the main body 40 locate. The pintles 49 and gudgeons 61, 62 define a pivot axis about which the first bracing member 60 is pivotable relative to the main body 40. The pivot axis defined by the gudgeons 61, 62 and pintles 49 is parallel to the pintle line 45. Accordingly, the gudgeons 61, 62 extend in a direction orthogonal to the pintle line 45, and are parallel to the gudgeons 46, 47 of the main body 40.

In other words, the first bracing member 60 is pivotally coupled to the main body 40 at the apex 63 of the inverted "A" shape of the first bracing member 60 (or at the apex of the "V" shape or base of the "Y" shape if the cross-member 66 is omitted from the first bracing member 60).

At the opposite end of the first bracing member 60 from the main body 40 are third and fourth gudgeons 67, 68, extending perpendicularly relative to the cross-member 66 in the illustrated example. The third gudgeon 67 is essentially a continuation of the first side member 64, and the fourth gudgeon 68 is essentially a continuation of the second side member 65. The pivot axis defined by the third and fourth gudgeons 67, 68 is parallel to the pintle line 45 (and is also parallel to the pivot axis defined by the first and second gudgeons 61, 62 and pintles 49).

The second bracing member 70 is pivotally coupled to the third gudgeon 67 by means of the first fuse pin 100. Similarly, the third bracing member 80 is pivotally coupled to the fourth gudgeon 68 by means of the second fuse pin 110.

Figure 5:
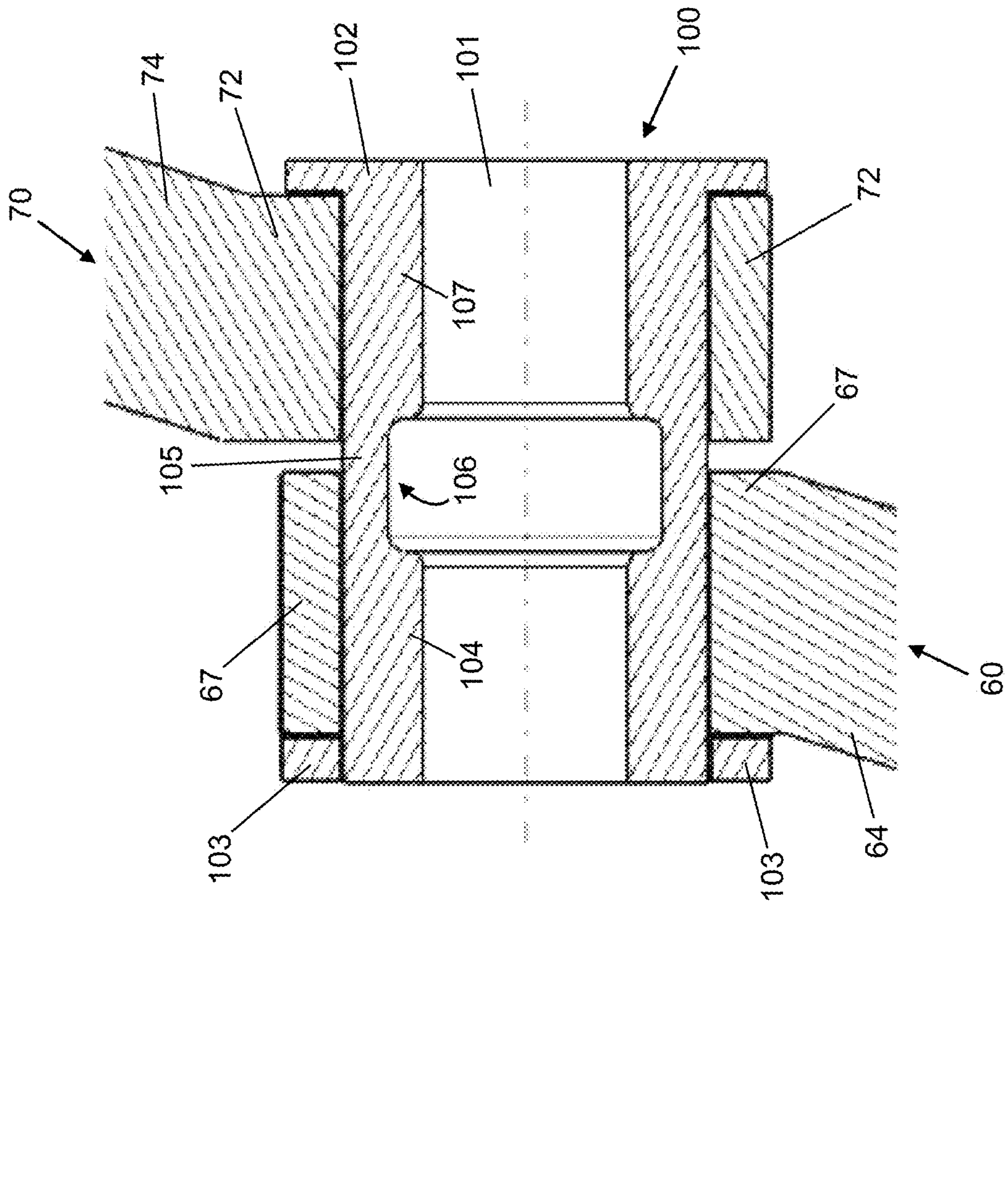
FIG. 5 is a cross-sectional view through the inset portion of FIG. 3, showing a fuse pin pivotally coupling the first and second bracing members together, and also showing a region of preferential weakness within the fuse pin.

In more detail, the second bracing member 70 comprises a first end part 72 having an aperture therein through which the first fuse pin 100 passes, a central part 74, and a second end part 76 having an aperture 78 therein. As shown in FIG. 5, the first end part 72 is pivotally coupled to the third gudgeon 67 of the first bracing member 60 by means of the first fuse pin 100 passing through the aperture in the first end part 72 and through the third gudgeon 67. The second end part 76 is pivotally coupled to the wing/body structure 20 of the aircraft by means of a pintle in or near to the landing gear bay 24, passing through the aperture 78.

Preferably (but not essentially) the second bracing member 70 is configured such that, when in the extended configuration as shown in FIG. 3, the central part 74 is substantially longitudinally aligned with (i.e. is substantially parallel to) the first side member 64 of the first bracing member 60. The first end part 72 is parallel to the third gudgeon 67 of the first bracing member 60. The second end part 76 is parallel to the first end part 72. Accordingly, the first and second end parts 72, 76 are each angled relative to the central part 74.

Expressed differently, the first joint comprises a first end part (the third gudgeon 67) of the first bracing member 60, the first end part 72 of the second bracing member 70, and the first fuse pin 100. The first fuse pin 100 passes through the aperture in the first end part (the third gudgeon 67) of the first bracing member 60 and through the aperture in the first end part 72 of the second bracing member 70 and pivotally couples the first end part (the third gudgeon 67) of the first bracing member 60 alongside and parallel to the first end part 72 of the second bracing member 70.

The third bracing member 80 is essentially a mirror image of the second bracing member 70. Thus, the third bracing member 80 comprises a first end part 82 having an aperture therein through which the second fuse pin 110 passes, a central part 84, and a second end part 86 having an aperture 88 therein. The first end part 82 is pivotally coupled to the fourth gudgeon 68 of the first bracing member 60 by means of the second fuse pin 110 passing through the aperture in the first end part 82 and through the fourth gudgeon 68. The second end part 86 is pivotally coupled to the wing/body structure 20 of the aircraft by means of a pintle in or near to the landing gear bay 24, passing through the aperture 88.

Preferably (but not essentially) the third bracing member 80 is configured such that, when in the extended configuration as shown in FIG. 3, the central part 84 is substantially longitudinally aligned with (i.e. is substantially parallel to) the second side member 65 of the first bracing member 60. The first end part 82 is parallel to the fourth gudgeon 68. The second end part 86 is parallel to the first end part 82. Accordingly, the first and second end parts 82, 86 are each angled relative to the central part 84.

Expressed differently, the second joint comprises a second end part (the fourth gudgeon 68) of the first bracing member 60, the first end part 82 of the third bracing member 80, and the second fuse pin 110. The second fuse pin 110 passes through the aperture in the second end part (the fourth gudgeon 68) of the first bracing member 60 and through the aperture in the first end part 82 of the third bracing member 80 and pivotally couples the second end part (the fourth gudgeon 68) of the first bracing member 60 alongside and parallel to the first end part 82 of the third bracing member 80.

When in the extended configuration, the bracing structure 50 supports the main body 40 in its deployed configuration, with sufficient strength and rigidity to enable the main body 40 to perform taxiing, takeoff and landing operations in a normal manner.

When in the retracted configuration (as in FIG. 2*b*) the second and third bracing members 70, 80 are folded relative to the first bracing member 60. That is to say, by the action of one or more actuators, the second bracing member 70 is brought substantially alongside the first side member 64 of the first bracing member 60, and the third bracing member 80 is brought substantially alongside the second side member 65 of the first bracing member 60. In parallel with this, the main body 40 is pivoted about the pintle line 45 and brought into its retracted configuration within the landing gear bay 24.

Referring to FIG. 5 in more detail (and also referring to the inset of FIG. 3), this shows the first fuse pin 100 within the first joint, pivotally coupling the third gudgeon 67 of the first bracing member 60 alongside the first end part 72 of the second bracing member 70. FIG. 5 also shows internal detail of the first fuse pin 100. The configuration of the first fuse pin 100 will now be described in more detail.

Externally, the fuse pin 100 comprises enlarged heads 102 and 103 that pivotally entrap the third gudgeon 67 of the first bracing member 60 alongside the first end part 72 of the second bracing member 70.

Internally, the fuse pin 100 is in the form of a hollow cylindrical shaft, having a hollow core 101 around which wall regions 104, 105, 107 are defined. The wall region 104 of the fuse pin 100 that passes within the third gudgeon 67 of the first bracing member 60 has the same thickness as the wall region 107 that passes within the first end part 72 of the second bracing member 70. However, notably, between wall region 104 and wall region 107 is a wall region 105 that is thinner than wall regions 104 and 107, to provide a region of preferential weakness between the third gudgeon 67 and the first end part 72 of the second bracing member 70. Expressed differently, wall region 105 incorporates an annular internal recess or waisted region 106 to form the region of preferential weakness. That is to say, the internal diameter of the hollow core 101 is greater in the region of preferential weakness, i.e. in the waisted region 106. In the event of the fuse pin 100 being subjected to the critical load, e.g. in a crash landing scenario, the fuse pin 100 is configured to shear about the region of preferential weakness, to decouple the second bracing member 70 from the first bracing member 60.

Notably, the region of preferential weakness is located in such a position along the fuse pin 100 that, in the event of the fuse pin shearing in a failure scenario, the second bracing member 70 is able to separate in a clean manner from the first bracing member 60. To this end, as illustrated in FIG. 5, the waisted region 106 may be offset towards the first bracing member 60 so that any burr resulting from the shear is insufficient to prevent the second bracing member 70 from cleanly separating from the first bracing member 60 in a failure scenario.

For completeness, it should be noted that the vertical lines surrounding the waisted region 106 in FIG. 5, crossing the hollow core 101, are merely to denote changes in the internal diameter of the hollow core 101, and do not represent partitions or the like extending across the hollow core 101.

It will be appreciated from FIG. 5 that, in and around the waisted region 106, rounded internal edges are used where the internal diameter of the hollow core 101 changes, to provide a relatively gradual change in the internal diameter and thereby mitigate against stress concentration effects.

As those skilled it the art will appreciate, the fuse pin 100 may be formed of a suitable heat-treated high-strength steel.

The configuration and arrangement of the second fuse pin 110 within the second joint is preferably a mirror image of the first fuse pin 100 within the first joint, and need not be described in detail.

Failure Mechanism

FIG. 6 illustrates the landing gear assembly 30 of FIG. 3, initially in the deployed configuration, undergoing a sequence of events during an extraordinarily hard landing or crash landing, causing the fuse pins 100, 110 to fail and the main body 40 to pivot aftwards.

Figures 6A, 6B, 6C:
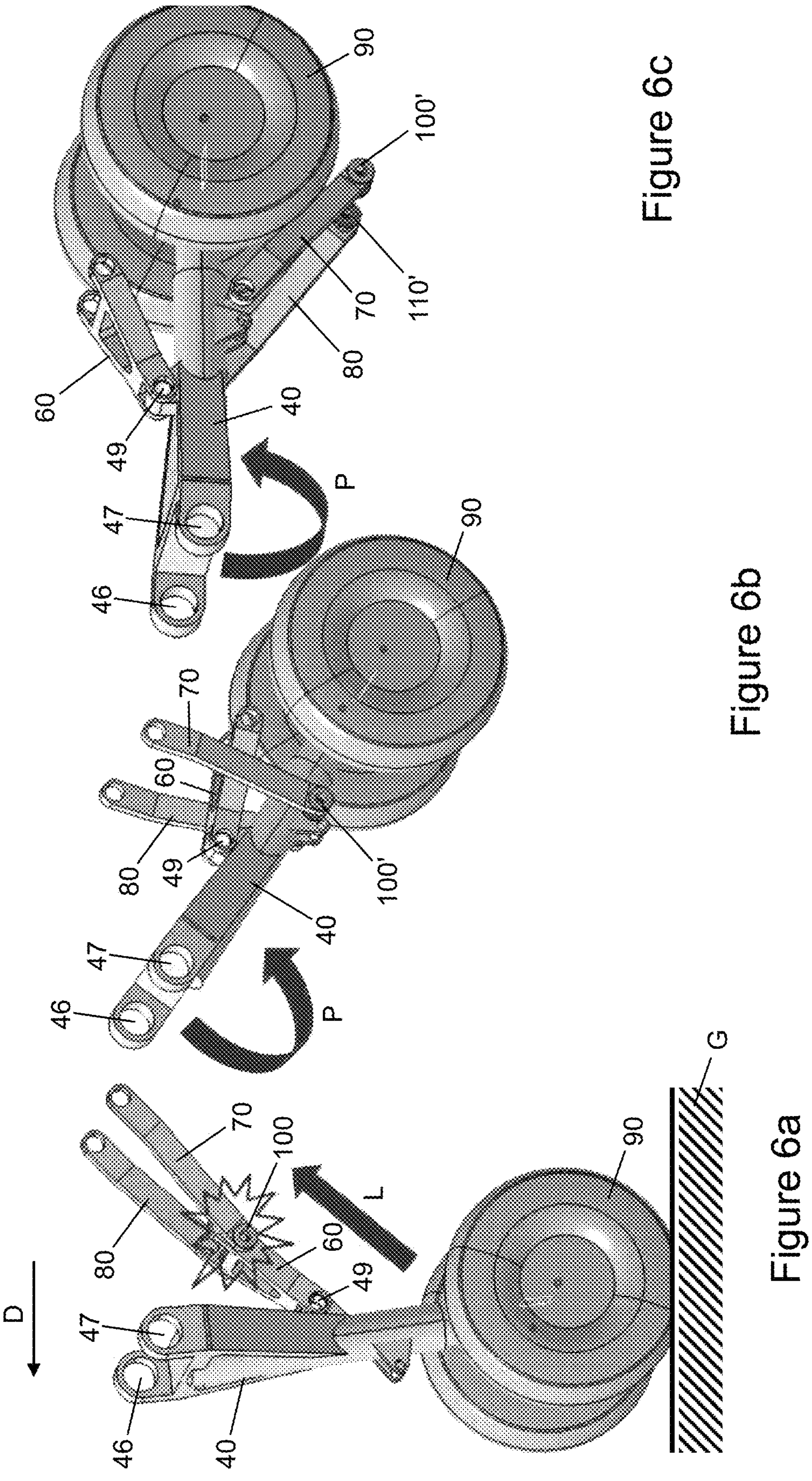
FIG. 6*a* illustrates the landing gear assembly of FIG. 3, in the deployed configuration, undergoing a sequence of events during an extraordinarily hard landing or crash landing, in a first step with the fuse pins shearing within the bracing structure, thereby decoupling the first bracing member (which remains coupled to the main body) from the second and third bracing members.
FIG. 6*b* illustrates the landing gear assembly of FIG. 3, in the deployed configuration, undergoing a sequence of events during an extraordinarily hard landing or crash landing, in a second step with the fuse pins shearing, the main body pivoting aftwards and passing between the second and third bracing members.
FIG. 6*c* illustrates the landing gear assembly of FIG. 3, in the deployed configuration, undergoing a sequence of events during an extraordinarily hard landing or crash landing, in a third step with the main body reaching a retracted position, as in the landing gear bay.

More particularly, in FIG. 6*a* the landing gear assembly 30 receives an extraordinarily hard impact from the ground G, imparting an impact load L on each of the fuse pins 100, 110 that is at least the critical load at which each of the fuse pins 100, 110 is engineered to undergo shear failure. Consequently, the fuse pins 100, 110 undergo shear failure and decouple the first bracing member 60 (which remains coupled to the main body 40 about the pivot point 49) from the second and third bracing members 70, 80. It will be appreciated that the fuse pins 100, 110 fail simultaneously, or substantially simultaneously, since they experience the same (or substantially the same) abnormally high impact load L simultaneously (or substantially simultaneously), and the configuration and internal characteristics of the fuse pins 100, 110 mirror one another.

As shown in FIG. 6*b*, the failure of the fuse pins 100, 110 together with the aftward direction of the impact load L (resulting from the forward motion of the aircraft in direction D when it meets the ground G) results in the main body 40 breaking free from the constraint otherwise provided by the bracing structure 50 and pivoting aftwards about the pintle line 45, in the direction of arrow P, with the first bracing member 60 remaining attached to the main body 40. (Here, the failed first fuse pin is denoted by 100'; the other failed fuse pin would correspond.) During this unrestrained pivoting the main body 40 passes between the second and third bracing members 70, 80. The second and third bracing members 70, 80 remain coupled to (and hang from) the wing/body structure 20 by means of their second end parts 76, 86.

As shown in FIG. 6*c*, the aftward pivoting of the main body 40 continues in the direction of arrow P, with the first bracing member 60 remaining attached, until the main body 40 reaches a retracted position in the landing gear bay 24.

It will be appreciated that, in a failure scenario, the main body 40 will transition rapidly and forcefully from the configuration shown in FIG. 6*a*, through that of FIG. 6*b*, and into that of FIG. 6*c*. Accordingly, the landing gear bay 24 may be provided with a buffer (e.g. a spring-loaded rubber cushion pad) to absorb the impact of the main body 40 in such a circumstance.

Thus, in the manner illustrated in FIGS. 6*a* to 6*c*, during a failure scenario the landing gear assembly 30 remains attached to the aircraft and collapses in a controlled manner into the landing gear bay 24, away from the passenger area 22 of the aircraft. The landing gear bay 24 therefore provides a safe area in which to receive the landing gear assembly 30 during a failure scenario, away from the passenger area 22.

MODIFICATIONS AND ALTERNATIVES

Detailed embodiments and some possible alternatives have been described above. As those skilled in the art will appreciate, a number of modifications and further alternatives can be made to the above embodiments whilst still benefiting from the inventions embodied therein.

For instance, in the illustrated example first and second components of preferential weakness are employed within the bracing structure 50, these being a first fuse pin 100 and a second fuse pin 110. However, in alternative examples a single component of preferential weakness may be provided within the bracing structure, such as a single fuse pin. In other examples one or more alternative components of preferential weakness may be provided, instead of fuse pin(s). For example, one or more struts of the bracing structure may be configured to fail upon a corresponding critical load being reached.

It should also be noted that, in the illustrated example, the first and second components of preferential weakness (the fuse pins 100, 110) are located essentially midway along the bracing structure 50. However, in alternative examples the component(s) of preferential weakness may be located at or near to an extremity of the bracing structure, for example at or near where the bracing structure is coupled to the main body, or at or near where the bracing structure is coupled to the wing/body structure of the aircraft.

Moreover, in the illustrated example the bracing structure 50 comprises second and third bracing members 70, 80 pivotally coupled to either side of the first bracing member 60 (i.e. outwardly of the first bracing member 60) and arranged such that, upon shearing of the first and second fuse pins 100, 110, the main body 40 is able to pivot aftwards, between the second and third bracing members 70, 80. Such a configuration of the bracing structure 50, being substantially symmetric to the left and right (i.e. port and starboard) of the pivot point 49, is structurally advantageous during normal operation. However, in alternative examples the bracing structure may comprise first and second bracing members 60, 70, without a third bracing member 80, potentially in an asymmetric configuration, with a single fuse pin 100 joining the first bracing member 60 to the second bracing member 70. In such a case, upon failure of the fuse pin 100, the main body 40 (with the first bracing member 60 attached) may pass past the second bracing member 70 into the landing gear bay 24.

Further, in the illustrated example each fuse pin 100 incorporates a single region of preferential weakness, i.e. the waisted region 106. However, in alternative examples each fuse pin 100 may have two or more regions of preferential weakness, such as two or more internal annular grooves alongside each other, that act as shear failure sites upon the critical load being reached.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A landing gear assembly for an aircraft, the landing gear assembly comprising:

a main body on which one or more wheels of the aircraft are mounted, the main body configured to pivot aftwardly; and a bracing structure coupled to the main body, the bracing structure configured to move between an extended configuration to support the main body in a deployed configuration, and into a folded configuration in which the main body is held in a retracted configuration;

wherein the bracing structure includes at least a first component of preferential weakness that is configured to fail when subjected to a critical load, wherein, upon failure of the first component of preferential weakness with the main body in the deployed configuration, the main body is decoupled from at least part of the bracing structure such that the main body is no longer constrained by a load-bearing portion of the bracing structure that resists aftward pivoting of the main body when the main body is in the deployed configuration, thereby enabling the main body to pivot aftwardly, and wherein the main body comprises a first pivot point and a second pivot point defining a pivot axis about which the main body is aftwardly pivotable, and a third pivot point to which the bracing structure is coupled, the third pivot point being beneath the first pivot point and the second pivot point.

2. The landing gear assembly according to claim 1, wherein the first component of preferential weakness comprises a first fuse pin configured to shear when subjected to a critical load, the first fuse pin incorporated in a first joint of the bracing structure.

3. The landing gear assembly according to claim 2, wherein the bracing structure comprises a first bracing member pivotally coupled to the main body, and a second bracing member pivotally coupled to the first bracing member about the first joint.

4. The landing gear assembly according to claim 3, wherein the bracing structure further comprises a third bracing member pivotally coupled to the first bracing member about a second joint on one side of the first joint, and wherein the second joint comprises a second fuse pin.

5. The landing gear assembly according to claim 4, wherein the first bracing member substantially comprises an inverted "A" shape, a "V" shape, or a "Y" shape, wherein the first bracing member is pivotally coupled to the main body at an apex of the first bracing member, and wherein the second bracing member and the third bracing member are each pivotally coupled to an end of the first bracing member opposite the main body.

6. The landing gear assembly according to claim 5, wherein the second bracing member and third bracing member are substantially longitudinally aligned with sides of the first bracing member with the bracing structure in the extended configuration, and wherein the second bracing member and third bracing member are folded relative to the first bracing member with the bracing structure in the retracted configuration.

7. The landing gear assembly according to claim 4, wherein the second bracing member and third bracing member are pivotally coupled to either side of the first bracing member and arranged such that, upon shearing of the first fuse pin and the second fuse pin, the main body is configured to pivot aftwardly and to pass between the second bracing member and third bracing member.

8. The landing gear assembly according to claim 4, wherein the first joint comprises:

a first end part of the first bracing member;

a first end part of the second bracing member; and the first fuse pin, wherein the first fuse pin passes through an aperture in the first end part of the first bracing member and through an aperture in the first end part of the second bracing member and pivotally couples the first end part of the first bracing member alongside the first end part of the second bracing member; and, wherein the second joint comprises:

a second end part of the first bracing member;

a first end part of the third bracing member; and the second fuse pin, wherein the second fuse pin passes through an aperture in the second end part of the first bracing member and through an aperture in the first end part of the third bracing member and pivotally couples the second end part of the first bracing member alongside the first end part of the third bracing member.

9. The landing gear assembly according to claim 8, wherein the first fuse pin comprises a region of preferential weakness aligned between the first end part of the first bracing member and the first end part of the second bracing member, and wherein the second fuse pin incorporates a region of preferential weakness aligned between the second end part of the first bracing member and the first end part of the third bracing member.

10. The landing gear assembly according to claim 9, wherein, in each of the first fuse pin and the second fuse pin, the region of preferential weakness is offset towards the first bracing member.

11. The landing gear assembly according to claim 1, wherein the main body further comprises a shock absorber beneath the third pivot point.

12. The landing gear assembly according to claim 1, wherein the landing gear assembly comprises a main landing gear assembly.

13. An aircraft comprising:

the landing gear assembly according to claim 1; and a landing gear bay, wherein the main body of the landing gear assembly is aftwardly pivotable into the landing gear bay, such that the main body enters the landing gear bay when the first component of preferential weakness fails when the main body is in the deployed configuration.

14. The aircraft according to claim 13, comprising a blended wing body aircraft.

15. The aircraft according to claim 13, wherein the landing gear bay is behind a passenger area.

16. The landing gear assembly according to claim 1, wherein the pivot axis is substantially transverse relative to a longitudinal axis of the aircraft.

17. The landing gear assembly according to claim 1, wherein the third pivot point is positioned below the pivot axis such that, upon failure of the first component of preferential weakness, the main body pivots aftwardly about the pivot axis.

18. The landing gear assembly according to claim 1, wherein failure of the first component of preferential weakness enables the main body to pivot aftwardly into a landing gear bay of the aircraft.

19. A landing gear assembly for an aircraft, the landing gear assembly comprising:

a main body on which one or more wheels of the aircraft are mounted, the main body configured to pivot aftwardly; and a bracing structure coupled to the main body, the bracing structure configured to move between an extended configuration to support the main body in a deployed configuration, and into a folded configuration in which the main body is held in a retracted configuration;

wherein the bracing structure includes at least a first component of preferential weakness configured to fail when subjected to a critical load with the main body in the deployed configuration, to thereby decouple the main body from at least part of the bracing structure and enable the main body to pivot aftwardly, wherein the first component of preferential weakness comprises a first fuse pin configured to shear when subjected to a critical load, the first fuse pin incorporated in a first joint of the bracing structure, wherein the bracing structure comprises a first bracing member pivotally coupled to the main body, and a second bracing member pivotally coupled to the first bracing member about the first joint, wherein the bracing structure further comprises a third bracing member pivotally coupled to the first bracing member about a second joint on one side of the first joint, and wherein the second joint comprises a second fuse pin.

* * * * *